May 15, 1934.  L. CAMPBELL, JR  1,958,741
BLOWPIPE
Filed Jan. 6, 1930

Inventor
Louis Campbell, Jr.,
By Hull, Brock &West,
Attorneys

Patented May 15, 1934

1,958,741

UNITED STATES PATENT OFFICE 1,958,741

BLOWPIPE

Lorn Campbell, Jr., Lakewood, Ohio

Application January 6, 1930, Serial No. 418,734

2 Claims. (Cl. 158—27.4)

This invention relates to blowpipes, and more particularly to a tip which is capable of quick and convenient substitution for the tip ordinarily employed with a welding blowpipe, whereby the latter may be converted with like facility into an efficient cutting blowpipe.

In certain fields of industry, such as the pipe welding, steam-fitting, and boiler working trades, the use of welding pipes is expanding rapidly. In work of this character in particular, it is frequently desirable to be able to change from a welding blowpipe to a cutting blowpipe and vice versa with a minimum loss of time. It is the general purpose and object of my invention to provide a cutting tip which will be adapted for quick substitution for the tip of a welding blowpipe and which, when so substituted, will operate in a particularly efficient manner to perform the cutting operations required.

Figure 1:
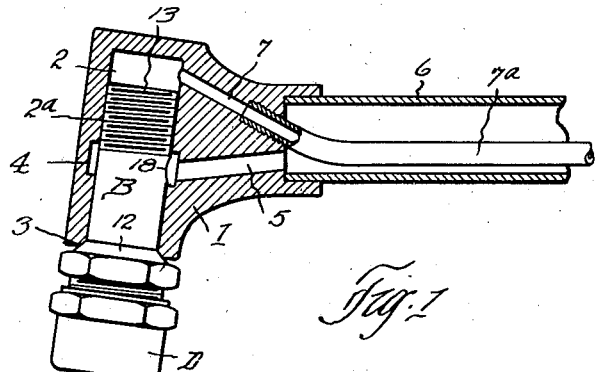
Figure 2:
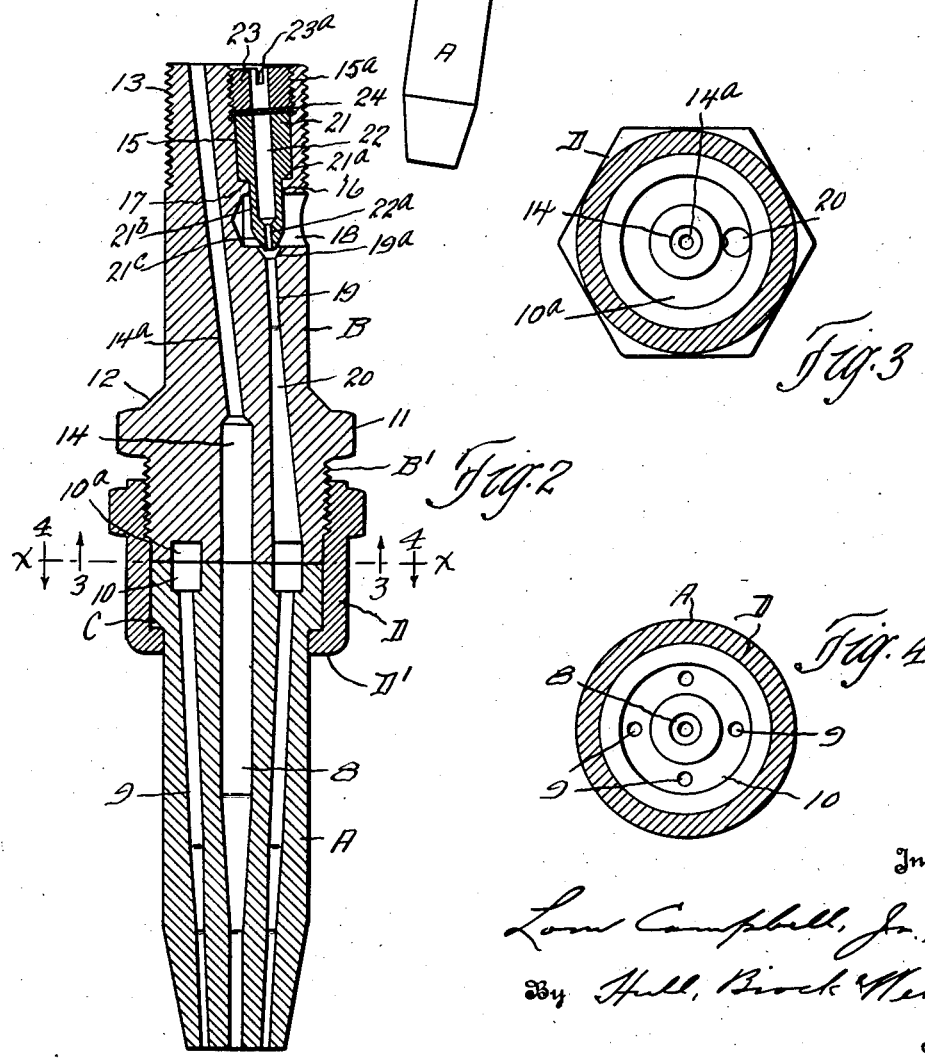
Figure 3:
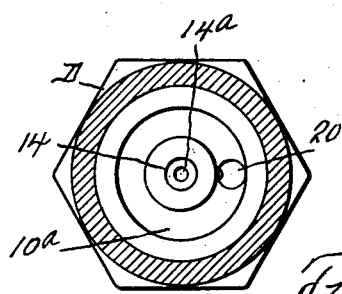
Figure 4:
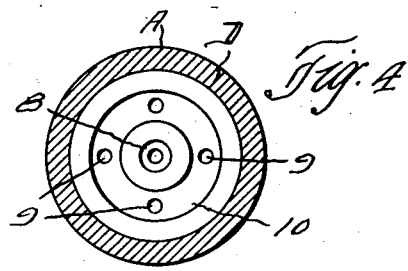

I accomplish the foregoing and other and more limited objects which will appear hereinafter in and through the construction and arrangement of parts shown in the accompanying drawing wherein Fig. 1 represents a sectional elevation through a blowpipe equipped with my tip; Fig. 2 a detail in central vertical section through such tip; Fig. 3 a detail in section corresponding to the line $x$—$x$ of Fig. 2 and looking in the direction of the arrows 3—3; and Fig. 4 a detail in section taken on the same line $x$—$x$, but looking in the direction of the arrows 4—4.

Describing the various parts by reference characters, 1 is the head of a blowpipe designed for use with a welding tip and having a cylindrical chamber 2 extending upwardly from the bottom thereof and provided at its bottom with a frusto-conical seat 3.

Between the top and the bottom, the chamber 2 is provided with an annular recess 4 constituting a distributing chamber for acetylene or other combustible gas supplied thereto through a passage 5 in the head, the said passage receiving its supply from a pipe 6. The head is also provided with a passage 7 through which oxygen is supplied into the upper end of the chamber 2 by means of a pipe 7$^a$.

The chamber 2 is provided with a threaded portion 2$^a$ located above the annular recess 4 and between the delivery ends of the passages 5 and 7. When the head, thus described, is used with a welding tip, the latter is provided with a central extension which threads into the correspondingly threaded portion 2$^a$ of the chamber 2 and with a frusto-conical seat which cooperates with the seat 3.

For the purpose of converting the welding blowpipe into a cutting blowpipe, I have devised the tip shown more particularly in Fig. 2. This tip comprises a lower member A and an upper shank member B. The upper end of the member A is provided with an outwardly projecting annular shoulder C which is engaged by the bottom D' of a gland nut D, the upper end of the latter being threaded upon the lower threaded end B' of the shank member B.

The lower tip member A is preferably of copper and is provided with a central bore 8, for cutting oxygen, about which are grouped bores 9 for preheating mixture, the bores 9 converging downwardly toward each other and toward the central bore. The upper ends of the bores 9 communicate with an annular recess 10 formed in the top of the member A.

The shank member B is preferably of brass and is provided above the threaded lower end B' thereof with an angular projection 11 for the reception of a wrench and, above such projection, with a frusto-conical seating surface 12 adapted to engage the corresponding seating surface 3 at the bottom of the chamber 2. Above the seating surface 12, the body of the shank member B is cylindrical, forming a snug fit with the interior of the cylindrical chamber 2, and is provided at its upper end with a thread 13 adapted to engage the thread 2$^a$ whereby, on screwing the tip in the appropriate distance, a tight seat may be provided between the parts 3 and 12.

The shank member B is provided with a passage formed by the bores 14, 14$^a$, the bore 14 extending axially from the bottom of said member and adapted to register with the top of the bore 8. The bore 14$^a$ extends at an angle from the bore 14 and through the top of the member B, this inclination of the bore 14$^a$ enabling it to clear the injector for combustible gas and the passage communicating therewith, which will now be described.

15 denotes a bore extending downwardly into the body B from the top thereof, the upper portion of the bore being provided with a thread 15$^a$. From the bottom of this bore there extends a smaller bore 16, there being an annular shoulder 17 between said bores. The bottom of the bore 16 merges with a port 18 which projects laterally into the body B from the outside thereof; and from said port a small bore 19 extends downwardly and communicates at its lower end with a larger tapering bore 20 the lower end of which communicates with an annular recess 10$^a$ which, when the parts A and B are assembled, provides an annular distributing chamber with the recess 10. The upper end of the bore 19 is flared outwardly and upwardly providing a frusto-conical surface 19ª.

21 denotes an injector having a cylindrical body adapted to fit snugly within the lower portion of the bore 15 and having an annular shoulder 21ª adapted to seat upon the shoulder 17, with a cylindrical extension 21ᵇ below the shoulder 21ª, which extension terminates in an inverted frusto-conical end 21ᶜ extending across the bottom of the port 18 and to the upper portion of the frusto-conical portion 19ª of the bore 19. The injector is provided with a central bore 22 the lower part 22ª of which is of comparatively small cross sectional area.

The injector is anchored in place by means of a lock nut 23, which is threaded into the upper portion of the bore 15 and which is provided with a central bore 23ª registering with the top of the bore 22. A screen 24 is clamped between the bottom of the lock nut 23 and the top of the injector.

With the parts constructed and arranged as described, it is believed that the operation will be readily understood. It will be noted that the top of the shank member B is spaced from the top of the chamber 2, so that the oxygen supplied through the passage 7 will pass in part through the bores 23ª, 22 and 22ª and will then entrain the acetylene or other combustible gas entering the port 18. The mixture of oxygen and combustible gas thus produced is mingled in the bore 19, and is expanded in the bore 20 and in the chamber 10, 10ª, and is delivered from the latter to and through the passages 9.

Oxygen for cutting purposes will pass from the top of the chamber 2 into the bores 14ª and 14 and be delivered thence to and through the central passage 8 of the lower member of the tip. The extended threaded connection between the top of the shank B and the part 2ª of the chamber 2 serves as a seal to prevent access of the oxygen in the chamber 2 to the acetylene or other combustible gas in the port 18, the chamber 4 and the passage 5.

The tip construction shown and described herein is simple in construction, economical of production, and is capable of quick and convenient application to and removal from the head 1, so that the said head may be equipped with corresponding facility with either a cutting tip or a welding tip. This facility of substitution of tips renders my tip particularly useful for the quick preparation of work for welding, as, for instance, beveling parts, trimming to fit, cutting to a proper angle, cutting holes for branch lines or couplings in pipe lines, etc.

Having thus described my invention, what I claim is:

1. An adapter for the head of a welding blowpipe having a chamber in the upper portion thereof and a passage for oxygen communicating with said chamber and having a lower passageway for combustible gas communicating with an annular recess below said chamber, the said head being threaded between said recess and chamber, the said adapter comprising a body having an upper threaded portion adapted to be threaded into the threaded portion of said head and provided with a passageway extending longitudinally therethrough whereby it may communicate at its upper end with the chamber in the upper portion of said head, the said body being provided with a lateral bore therein disposed below the threaded portion thereof and so located as to register with the said annular recess, an injector in the upper portion of said body arranged to communicate at its upper end with the chamber in said head, the said body having a second passageway extending longitudinally therethrough from and communicating with said lateral bore, the delivery end of said injector being located adjacent to the bottom of said bore and so located as to discharge into the upper end of the second passageway, and means for detachably securing to the lower end of said body a cutting tip having passages therethrough so located as to communicate respectively with the first-mentioned passageway in said body and with the second-mentioned passageway in said body.

2. An adapter for the head of a welding blowpipe having therein an upper passageway for oxygen and a lower passageway for combustible gas, the said adapter comprising a body having means for securing the same in said head with its upper end between the passageways thereof, the said body having a passageway extending longitudinally therethrough and arranged to receive oxygen from the upper passageway in said head and having a lateral bore below the top thereof so arranged and located as to receive combustible gas from the second passageway in said head, the said body being provided with an injector having its upper end arranged to receive oxygen from the upper passageway in said head and having its lower end arranged to deliver such oxygen across said bore, and the said body also having a second passageway extending to and through the lower end thereof from said bore, and means for detachably securing to the lower end of said body a cutting tip having passageways therethrough so located as to communicate respectively with the first-mentioned passageway in said body and with the second-mentioned passageway in said body.

LORN CAMPBELL, Jr.